(12) United States Patent
Tapaninen et al.

(10) Patent No.: US 7,430,432 B2
(45) Date of Patent: Sep. 30, 2008

(54) APPARATUS, AND ASSOCIATED METHOD, FOR CALCULATING COMMUNICATION CHANNEL INDICATIONS FOR USE IN A RADIO COMMUNICATION SYSTEM THAT UTILIZES CLOSED-LOOP POWER CONTROL

(75) Inventors: Jukka Tapaninen, San Diego, CA (US); Jean-Marie Tran, San Diego, CA (US); TG Vishwanath, San Diego, CA (US)

(73) Assignee: Nokia Corporation, Espoo (FI)

( * ) Notice: Subject to any disclaimer, the term of this patent is extended or adjusted under 35 U.S.C. 154(b) by 554 days.

(21) Appl. No.: 10/932,914

(22) Filed: Sep. 2, 2004

(65) Prior Publication Data

US 2006/0046660 A1    Mar. 2, 2006

(51) Int. Cl.
*H04B 7/00* (2006.01)
(52) U.S. Cl. ......................... 455/522; 455/69
(58) Field of Classification Search ............ 455/69, 455/522, 63.1, 67.11, 67.13; 370/318
See application file for complete search history.

(56) References Cited

U.S. PATENT DOCUMENTS

2002/0151323 A1   10/2002   Bender et al.
2003/0109221 A1*  6/2003   You et al. .................. 455/13.4
2005/0037796 A1*  2/2005   Tsai et al. ................... 455/522
2005/0111358 A1*  5/2005   Hsu et al. .................... 370/229
2007/0086513 A1*  4/2007   Fernandez-Corbaton et al. . 375/148

FOREIGN PATENT DOCUMENTS

EP        0977371 A2    2/2000

* cited by examiner

*Primary Examiner*—Nguyen Vo
(74) *Attorney, Agent, or Firm*—Alston & Bird LLP

(57) ABSTRACT

Apparatus, and an associated method, for determining a carrier-to-interference ratio to be used in a closed-loop power control scheme to control power levels at which data is sent to a mobile station operable pursuant to a high-rate data communications service. A signal power level calculator calculates power levels of a pilot signal at successive power control group intervals. Calculations are made of the noise power levels, and a ratio of the values is formed. A report is generated and returned to a network part of the communication system, thereby to provide indications of the network part used to alter the power levels at which data is communicated to the mobile station.

10 Claims, 4 Drawing Sheets

APPARATUS, AND ASSOCIATED METHOD, FOR CALCULATING COMMUNICATION CHANNEL INDICATIONS FOR USE IN A RADIO COMMUNICATION SYSTEM THAT UTILIZES CLOSED-LOOP POWER CONTROL

The present invention relates generally to a manner by which to facilitate power control in a radio communication system, such as a cellular communication system that operates pursuant to a CDMA (code-division, multiple-access) communication scheme. More particularly, the present invention relates to apparatus, and an associated method, by which to calculate communication channel indications, e.g., carrier-to-interference ratios, that are used pursuant to a power control scheme to control the power levels at which data is communicated during operation of the radio communication system.

Calculations of the values are performed in manners that are of reduced computational and storage requirements. When implemented at a mobile station operable in a cellular communication system that utilizes closed-loop power control, calculation of the control channel indications are completed quickly, thereby to facilitate rapid reporting of the calculated indications, and resultant power-level change pursuant to the power control scheme.

BACKGROUND OF THE INVENTION

Many aspects of modern society require ready access to communication systems through which to communicate data. A communication system through which the data is communicated includes, at a minimum, a set of communication stations. At least one of the communication stations forms a sending station, and at least another of the communication stations forms a receiving station. A communication channel interconnects the sending and receiving stations.

When data is to be communicated, such as pursuant to a communication session by which to effectuate a communication service, the sending station causes the data to be communicated upon the communication channel for delivery to the receiving station. When delivered to the receiving station, the receiving station detects the delivered data, and the receiving station operates to recover the informational content of the communicated data.

Various types of communication services are effectuated through use of various types of communication systems. Continuing advancements in communication technologies have, and continue to, permit data to be communicated in more efficient manners and to provide for the effectuation of communication services that previously were unavailable.

A radio communication system is an exemplary type of communication system. In a radio communication system, the communication channel that interconnects the sending and receiving stations comprises a radio channel. A radio channel is defined upon a radio link, i.e., a non-wireline link, that extends between the communication stations. Because communications are effectuated upon a radio channel rather than upon a channel defined in a wireline that extends between communication stations of a wireline communication system, communication stations of a radio communication system need not be positioned at locations that are permitting of connections to wirelines. And, thereby, communications are by way of a radio communication system through use of communication stations positioned at locations from which communications would not be permitted by way of wireline communication systems. Use of radio communication systems provides for the possibility, therefore, of increased availability of communications. Additionally, the radio communication system is implementable as a mobile communication system in which one or more of the communication stations of the radio communication system is provided with communication mobility. Advancements in digital communication techniques are amongst the advancements in communication technologies that have been applied to, and deployed in, radio communication systems. Various communication advantages are provided through the use of digital communication techniques. More efficient data communications, for instance, are possible, permitting bandwidth allocations to a communication system to be utilized more efficiently.

A cellular communication system is a type of mobile radio communication system. Successive generations of cellular communication systems have been developed and deployed to provide for communications therethrough. Significant portions of the populated areas of the world are encompassed by the network parts of cellular communication systems.

While early-generation, cellular communication systems generally utilized analog communication techniques, newer-generation systems generally utilize digital communication techniques. While the early-generation systems generally were used solely for voice communications, increasingly, cellular communication systems are utilized to effectuate data intensive communication services.

A so-called, CDMA2000 cellular communication system, for instance, provides for multi-rate data communication services. Data communication schemes, e.g., a 1xEV-DV communication scheme or a 1xEV-DO communication scheme for use in a CDMA2000 communication system provides for the communication of data at high, and variable, data rates. As in other variants of communication systems that utilize code division multiplexing, the power levels at which data is communicated must be closely controlled to ensure that the power level at which data is communicated is not so high as to interfere with other concurrently-communicated data. Power control schemes are used to control the power levels of the communicated data.

The power level at which data is communicated is dependent upon various factors, including the amount of concurrent communications within a specified area. As the level of communications, i.e., the number of users, varies, the power availability, available for allocation to a particular set of communication stations, changes. The manner by which data is communicated pursuant to a 1xEV-DV communication service is dependent upon, amongst other things, channel conditions. When conditions are good, higher order modulation schemes are utilized with high code rate FEC (frame error control) to facilitate maximization of data throughput. When communication conditions are poor, the modulation order is reduced and the code rate FEC is also reduced. Channel conditions are susceptible to quick changes, and a reporting mechanism is required by which quickly to determine and to report upon the channel conditions. And, in particular, a carrier-to-interference ratio, C/I, determination and report is needed to be made to make the modulation and FEC decisions.

What is needed, therefore, is a manner by which to calculate the carrier-to-interference ratio, or other communication channel indication, quickly.

It is in light of this background information related to communications in a radio communication system that the significant improvements of the present invention have evolved.

SUMMARY OF THE INVENTION

The present invention, accordingly, advantageously provides apparatus, and an associated method, by which to facilitate power control in a radio communication system, such as a cellular communication system that operates pursuant to a CDMA (codes-division, multiple-access) communication scheme.

Through operation of an embodiment of the present invention, a manner is provided by which to calculate communication channel indications, e.g., carrier-to-interference ratios, to be used pursuant to a power control scheme. The power control scheme controls the power levels at which data is communicated during operation of the radio communication system.

In one aspect of the present invention, the calculations of the communication channel indications are carried out in manners that are of reduced computational complexities and of reduced storage requirements relative to conventional manners by which to make the calculations. Through the reduced computational and storage requirement complexities, the calculations are able to be made more quickly, thereby permitting effectuation of power control more rapidly. When the communication system exhibits a quickly-changing radio environment, the calculations required to obtain the values used pursuant to power control are timely made and used to effectuate, in a timely manner, the power control.

In another aspect of the present invention, power control is effectuated in a cellular communication system that provides high speed data services, such as a 1XEV-DV or 1XEV-DO data service of a new-generation CDMA communication system. The data service is, originated at a network part of the communication system for delivery to a mobile station. The mobile station makes calculations of the radio environment and the calculations are used at the network part pursuant to the effectuation of power control. Computations are successively made at the mobile station and successively reported to the network part. As conditions of the radio environment change, the calculations indicate the change, and a report indicating the change is provided to the network part. Responsive to the report, the power level at which the data is sent by the network part is appropriately altered. In a CDMA communication system that provides for the high speed data services, a pilot signal is also generated by the network part. The mobile station monitors the pilot signal, and the calculations made by the mobile station are made upon the measurements of the pilot signal channel. The pilot signal includes a part that is formatted into successive power control groups. Calculations are made at the mobile station of the radio environment based upon the pilot signal within each of the successive power control groups. And, reports are generated and returned to the network part based upon calculations made within each of the successive power control groups. In one implementation, calculations are made, and reports are generated, at successive 1.25 ms intervals.

In one implementation, a channel estimate is provided with signals representative of the pilot signal. The channel estimate for operates to form channel-estimated representations of the signals. And, power-level calculations are performed upon the channel-estimated representations to form values that indicate that the power levels of the pilot signal. That is to say, at the end of every power control group, computations are made of the power levels of the values within the power control group.

In a further aspect of the present invention, a noise estimator is utilized to perform calculations to calculate noise power levels of noise on the pilot channel upon which the pilot signal is communicated. The calculations by the noise signal estimator may calculations of the noise levels for the corresponding periods for which the data power level calculator makes its calculations. In the exemplary implementation in which the pilot-signal, power control bits are formatted into power control groups, the noise levels are successively calculated for the corresponding power control groups.

The calculated values of the signal power level and the calculated values of the noise levels are together used to form a ratio of such values. That is to say, the pilot signal power level and the noise levels are provided to a ratio calculator that calculates the ratio of the signal power level to the noise power level. Successive ratios are calculated for successive ones of the power control groups.

A ratio reporter, embodied at the mobile station, is used to form a report that is caused to be sent by the mobile station upon a reverse link back to the network part of the communication system. The calculated ratios are caused to be sent at, e.g., intervals corresponding to the power control groups, e.g., at 1.25 ms intervals. And, when implemented in a CDMA2000 system that defines a R-CQICH channel, the reports are sent on the R-CQICH channel.

In an exemplary mobile station, a rake receiver is conventionally utilized, utilizing a plurality of fingers. In one implementation, the ratios are calculated in each of the rake-receiver fingers. And, selection or combination is made of the calculated ratios in manners that are otherwise conventional and a report is generated for return to the network part of the communication system.

Because estimations of the power levels of the pilot signal are generated at the culmination of a power control group, the computational complexity of the calculations are reduced while still permitting timely reports to be generated and used pursuant to a power control scheme.

In these and other aspects, therefore, apparatus, and an associated method, is provided for calculating a communication channel indicia associated with a communication channel upon which data is communicated to a communication station. A channel estimator is adapted to receive indications of the data communicated to the communication station. The channel estimator forms an estimate of the channel upon which the data is communicated responsive to at least a first group of the indications of the data. Channel-estimated representations of the indications of the at least the first group are formed. A data power-level calculator is coupled to the channel estimator and is adapted to receive the channel-estimated representations formed by the channel estimator. The data power-level calculator calculates power levels of the data. The power levels of the data calculated by the data power-level calculator are used to calculate the channel indicia.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
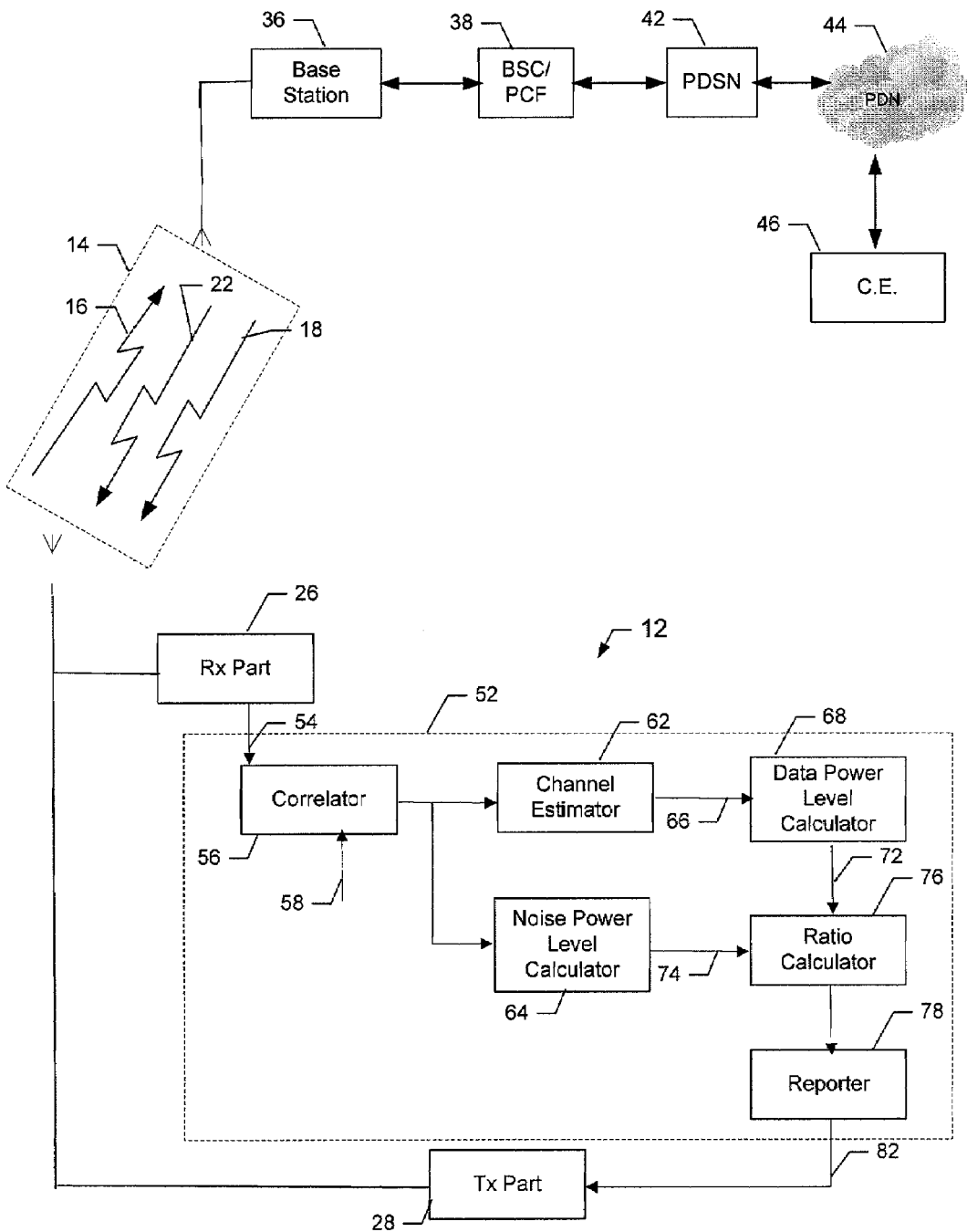
FIG. 1 illustrates functional block diagram of a radio communication system in which an embodiment of the present invention is operable.

Referring first to FIG. 1, a radio communication system, shown generally at 10, provides for radio communications with mobile stations, which the mobile station 12 is representative. In the exemplary implementation, the radio communication system is operable in general conformity with the operating protocol set forth in a CDMA2000 operating specification. And, further, the communication system provides for high-speed, data communications, e.g., 1xEV-DV or 1xEV-DO data services. While the following descriptions shall describe exemplary operation of an embodiment of the present invention with respect to its implementation in a CDMA2000-compliant communication system in which 1xEV-DV data services are provided, it should be understood that the teachings of the present invention are analogously implementable in other types of communication systems. More generally, the teachings of the present invention are applicable in a communication system in which closed-loop, power control is used to control the levels at which data is communicated.

The mobile station 12 operates to transceive data by way of channels defined upon a radio air interface 14 extending between the mobile station and the network part of the communication system. Data communicated by the network part of the communication system to the mobile station is communicated upon forward link channels, here represented by the arrow 16. And, data communicated by the mobile station to the network part is communicated upon reverse link channels, here designated by the arrow 18. Control channels are defined upon the forward and reverse links, and a pilot channel, also a control channel, is represented by the arrow 22. A pilot signal is broadcast upon the pilot channel, and the mobile station monitors the pilot channel to detect the communication of the pilot signal thereon.

The mobile station includes transceiver circuitry, here formed of a receive part 26, and a transmit part 28 that operates to transceiver data during operation of the communication system. Data communicated by way of a forward link, or the pilot channel, is detected, and operated upon, by the receive circuitry. And, data to be communicated by the mobile station 12 is provided to the transmit part 28 to be converted into a form for communication upon a reverse link channel defined upon a reverse link 18.

The network part of the communication system includes base stations, of which the base station 36 is representative. Base station includes transceiver circuitry (not separately shown) that transceives data communicated by way of the radio air interface during operation of the radio communication system. The base station, in turn, is coupled to a controller 38. The controller 38 controls, amongst other things, operation of the base station 36 as well as other base stations (not separately shown) that are coupled thereto. The controller is here represented as a base station controller/packet control function (BSC/PCF).

The base station controller/packet control function, in turn, is coupled to a packet data support node (PDSN) 42. And, the packet data support node is coupled to a packet data network 44. A correspondent entity (CE) 46 is coupled to the packet data network 42. The correspondent entity is representative of any communication device that forms a data source or a data sync, such as a communication server containing data, selected portions of which are accessed and communicated to the mobile station by way of a communication path formed through the network part of the communication system and by way of a forward link channel 16 defined upon the radio air interface.

As noted previously, the power level at which the data is communicated on the radio air interface is dependent upon various factors, including the availability of resources to allocate to the effectuation of the communication service as well as channel conditions when the data is communicated. As the power level is dependent, in part, upon the channel conditions, the channel conditions must be determined, and indications of the determinations must be provided to the resource allocation functionality embodied at the network part to alter the power levels, as appropriate, of the data. Also as noted previously, the CDMA2000 system utilizes a closed loop power-control scheme in which the mobile station makes measurements with respect to forward link communications and sends reports back to the network part for the resource allocation functionality to use in its resource allocations. As the computations must be made quickly, the computational complexity of the calculations must be of levels permitting timely completion of the calculations so that the reports can be made in a timely manner to the resource allocation functionality.

The mobile station further includes apparatus 52 of an embodiment of the present invention. The apparatus 52 makes calculations, here calculations of C/I carrier-to-interference, ratio and generates reports for communication back to the network part. The apparatus 52 is formed of functional entities, implementable in any desired manner, such as, for example, by algorithms executable by processing circuitry.

The apparatus is coupled to both receive and transmit parts 26 and 28 of the mobile station and, in an exemplary implementation, includes entities that are embodies at either, or both, of the receive and transmit parts. The apparatus is coupled to the received part 26, here indicated by way of the line 54, to receive, at base band frequency levels, indications of energy levels detected upon the pilot channel 22. The energy levels are of the pilot signal broadcast thereon and noise energy detected on the channel. The indications are provided to a correlator 56 that correlates values of the indications with a PN sequence, here provided by way of the line 58. Correlated sequences are formed and are provided to a channel estimator 62 and to a noise estimator 64 forming a noise power level calculator.

Channel-estimated indications formed by the channel estimator are provided, by way of the lines 66, to a power level calculator 68. The power level calculator operates to calculate power levels of the channel-estimated indications. And, the noise estimator 64 forming the noise power calculator calculates power levels of noise on the pilot channel. Values calculated by the respective calculators 68 an 64 are generated on the lines 72 and 74, respectively. The values generated thereon are representative of the power levels of the carrier, i.e., the pilot signal, and of the noise levels detected on the pilot channel. The values are provided to a ratio calculator 76 that calculates the ration there between. And, a ratio reporter 78 is provided with the calculated ratios. The ratio reporter generates a report that is provided, here by way of line 82, to the transmit part. And, the transmit part communicates, pursuant to a feed back relationship, the calculated values for delivery to the network part. And, power levels of the data communicated upon the forward link channel is adjusted, as needed.

In the exemplary implementation, at least some of the functionality of the apparatus 52 is embodied in a finger of a rake receiver forming part of the receive part of the mobile station. And, in one implementation, portions of the functionality of the apparatus 52 are embodied in each of the fingers of the rake receiver. Combining or selection procedures otherwise conventional of rake receiver operation is performed by way of which to select the values that are to be contained in the report formed by the ratio reporter.

The values formed by the channel estimator are formed at the end of power control groups in to which parts of the pilot signal are successively formed. And, the calculations performed by the data power level calculator 68 are performed to correspond to the values provided to the successive power control groups rather than at each symbol interrupt times. Thereby, processing complexity is reduced.

Figure 2:
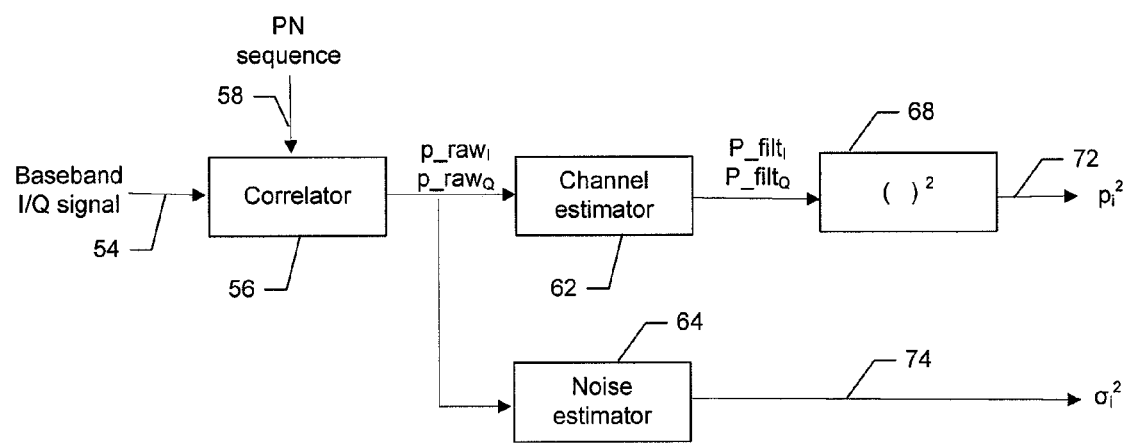
FIG. 2 illustrates a functional block diagram of a portion of the apparatus shown in FIG. 1 of an embodiment of the present invention.

FIG. 2 again illustrates portions of the apparatus 52 shown to form part of the mobile station 12, shown in FIG. 1. The correlator 56, channel estimator 62, the noise estimator forming the noise power level calculator 64, and the power level calculator 68 are illustrated.

The indications of the energy detected on the pilot channel are provided to the correlator 56 on the line 54. Here, the signal is represented in terms of an I- and a Q-component, together referred to as an I/Q signal. The I and Q components of the signal are, in conventional manner, 90 degrees out of phase with one another. Correlated values of the I and Q component power levels are formed, here designated by $p\_raw_I$ and $p\_raw_Q$. The values are provided to the channel estimator 62 and to the noise estimator 64. The channel estimator forms an output on the lines 66 at the end of every power control group of the I- and Q-component power levels. The values are designated by $P\_filt_I$ and $P\_filt_Q$. The values are provided to the power level calculator 68 and the power levels are computed thereat. Noise power level calculations are also performed at the noise estimator 64, but upon the values formed by the correlator 56.

At the end of every power control group, estimates of the signal and noise powers are computed by the entity 68 and 54, respectively. And, from the values that are computed, the ratio of the carrier signal to the inference, C/I, is calculated and reported back to the network part. In the exemplary implementation that defines R-CQICH, the report is communicated by the mobile station on this reverse channel quality indicator.

Mathematically, the signal power, $p_i^2$ is:

$$p_i^2 = P\_filt_I * P\_filt_I + P\_filt_Q * P\_filt_Q$$

Wherein the values $P\_filt_I$ and $P\text{-}filt_Q$ are the channel estimation filter outputs generated on the line 66 at the end of the power control group.

And, the noise power level $\sigma^2$ is computed from the raw pilot symbols formed by correlator and represented as follows:

$$\sigma_i^2(t) = \sigma_i^2(t-1) + (p\_raw_I(t) - p\_raw_Q(t) - p\_raw_Q(t-1))^2$$

The ratio calculated by the ratio calculator 74 (shown in FIG. 1) is estimated using a pilot weighted MRC approach, represented mathematically as:

$$\frac{C}{I} = \frac{\left(\sum_{i}^{n} p_i^2\right)^2}{\sum_{i}^{n} \sigma_i^2 p_i^2}$$

Figure 3:
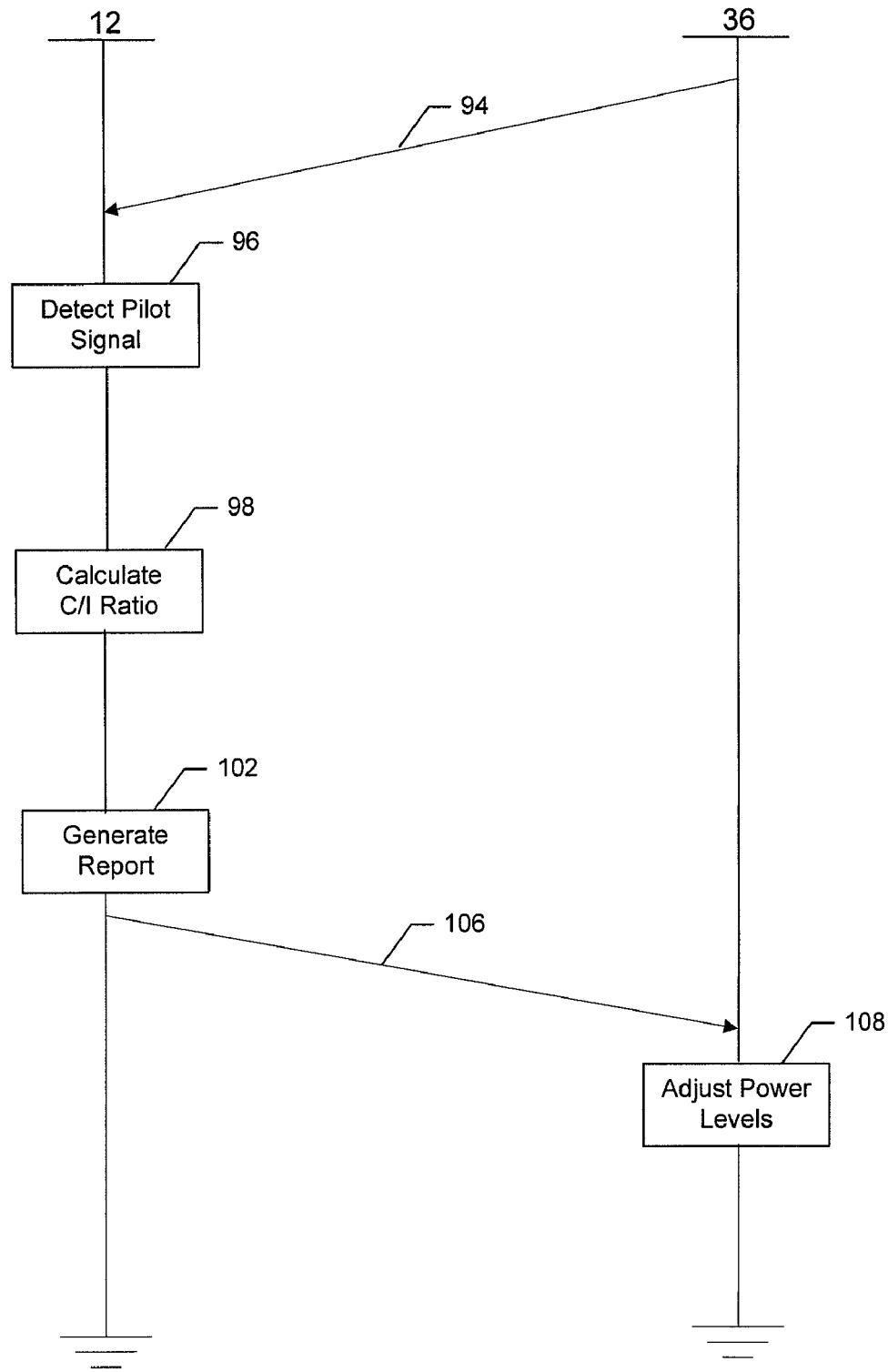
FIG. 3 illustrates a message sequence diagram that illustrates signaling generated during operation of the radio communication system shown in FIG. 1 pursuant to operation of an embodiment of the present invention.

FIG. 3 illustrates a message sequence diagram, shown generally at 92, representative of signaling, and other operation performed pursuant to the operation of the radio communication system 10 shown in FIG. 1. Here, signaling between the mobile station 12 and the base station 36 is represented.

A pilot signal, represented by the segment 94, is broadcast by the base station. The pilot signal is, for example, continuously broadcast. The mobile station monitors the pilot channel upon which the pilot signal is broadcast and detects, indicated by the block 96, delivery of the pilot signal to the mobile station. Energy levels of the energy detected on the pilot channel are used to calculate the C/I ratio, here indicated at the black 98, in manners as described previously. A report is generated, indicated by the block 102, and the report is sent back, indicated by the segment 106, back to the base station. Once delivered to the base station, the response is utilized by resource allocation functionality of the network part to adjust power levels of data sent upon a forward link channel. As the radio environment changes, the detected values detected at the mobile station change, the C/I ratio changes, and reports indicative of the changes are reported back to the network part. In an exemplary implementation, reports are generated at 1.25 ms intervals, permitting quick power changes to be made of the power levels at which data is sent by the network part.

Figure 4:
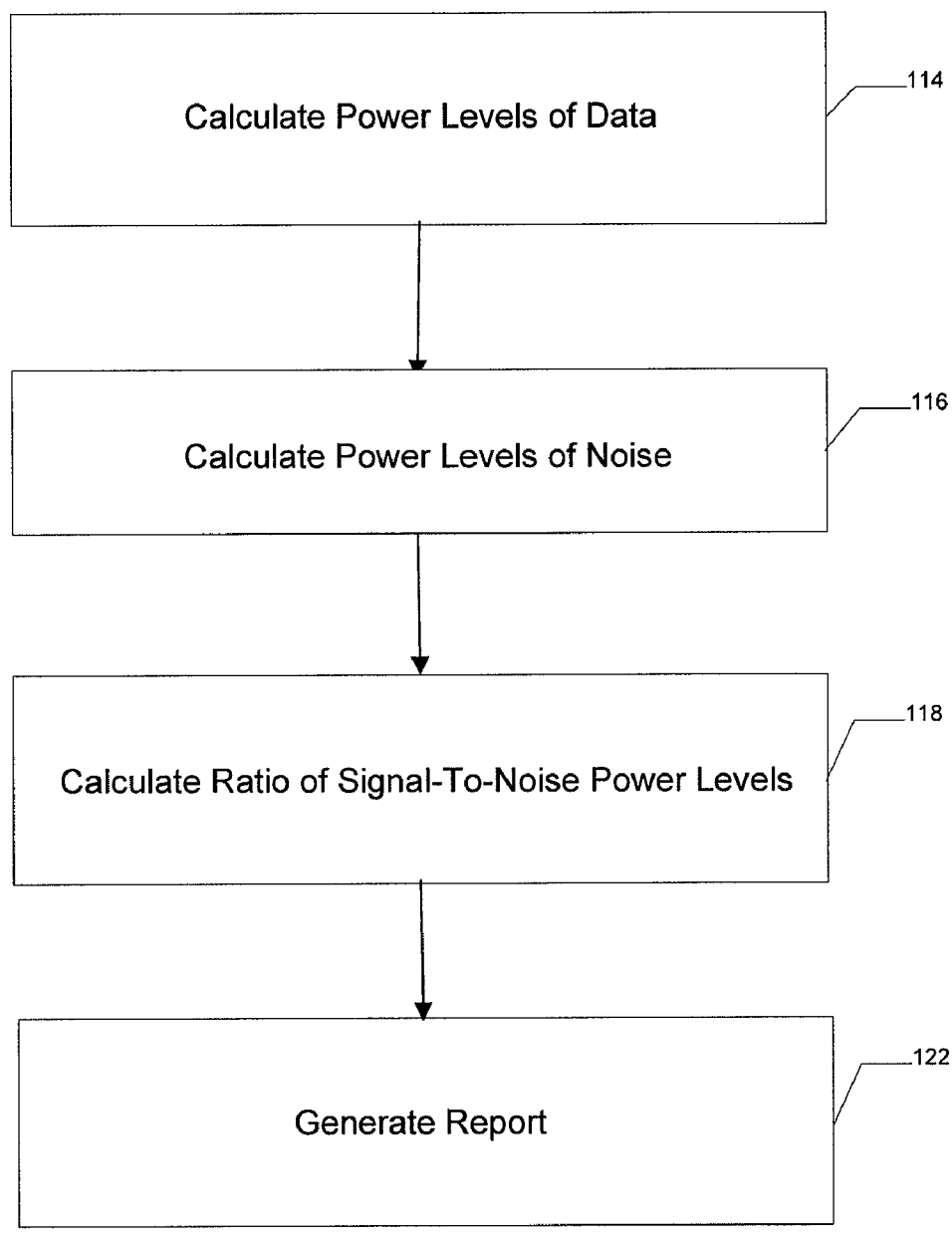
FIG. 4 illustrates a method flow diagram listing the method of operation of an embodiment of the present invention.

FIG. 4 illustrates a method flow diagram, shown generally at 112, representative of the method of the operation of an embodiment of the present invention. The method calculates a communication channel indicia associated with a communication channel upon which data is communicated to a communication station.

First, and as indicated by the block 114, power levels of the data are calculated responsive to representations of indications of at least a first group of the data delivered to the communication station. Then, and as indicated by the block 116, power levels of the noise introduced upon the data communicated to the communication station is calculated responsive to indications of the at least the first group of the data. The power levels of the data and of the noise together are used to form the communication channel indicia associated with the communication channel.

Further pursuant to the operation of the method, a ratio is calculated, as indicated by the block 118, between the power levels of the data and power levels of the noise. And, as indicated by the block 122, a ratio report is generated to be used pursuant to a power control scheme by way of which to control power levels at which data is communicated to the communication station pursuant to a data communication service.

The previous descriptions are of preferred examples for implementing the invention, and the scope of the invention should not necessarily be limited by this description. The scope of the present invention is defined by the following claims.

What is claimed is:

1. Apparatus for calculating a communication channel indicia associated with a communication channel comprising a pilot channel upon which data comprising a pilot signal formatted into successive power control groups is communicated to a communication station, said apparatus comprising:
a channel estimator adapted to receive indications of the data communicated to the communication station, said channel estimator for forming an estimate of the pilot channel for each of the successively received power control groups and for forming channel-estimated representations of the indications of each of the successively received power control groups;
a data power-level calculator coupled to said channel estimator and adapted to receive the channel-estimated representations followed by said channel estimator, said data power-level calculator for calculating power levels of the data for each of the successively received power control groups, the power levels of the data calculated by said data power-level calculator used to calculate the channel indicia;

a noise power-level calculator adapted to receive the indications of the data communicated to the communication station, said noise power-level calculator for calculating power levels of noise introduced upon the data communicated to the communication station for each of the successively received power control groups;

a ratio calculator adapted to receive indications of the power levels of the data calculated by said data power-level calculator and to receive indications of the power levels of the noise calculated by said noise power-level calculator, said ratio calculator for calculating a ratio therebetween for each of the successively received power control groups; and a ratio reporter adapted to receive indications of the ratio calculated by said ratio calculator, said ratio reporter for generating a ratio report, wherein the generated radio report is communicated upon a reporting channel for each of the successively received power control groups.

2. The apparatus of claim 1 wherein the ratio calculated by said ratio calculator comprises the communication channel indicia associated with the communication channel.

3. The apparatus of claim 1 wherein the ratio calculated by said ratio calculator comprises a representation of a carrier to interference ratio value.

4. The apparatus of claim 1 wherein the communication station comprises a mobile station operable in a radio communication system and wherein said channel estimator and said data power-level calculator are embodied at the mobile station.

5. The apparatus of claim 1, wherein the data power-level calculator calculates power levels based upon filtered channel-estimated representations.

6. The apparatus of claim 1, wherein the noise power-level calculator calculates power levels based upon unfiltered indications of the data communicated to the communication station.

7. A method for calculating a communication channel indicia associated with a communication channel comprising a pilot channel upon which data comprising a pilot signal formatted into successive power control groups is communicated to a communication station, said method comprising the operations of:

calculating power levels of the data for each of the successively communicated power control groups delivered to the communication station;

calculating power levels of noise introduced upon the data communicated to the communication station for each of the successively communicated power control groups;

calculating a ratio between the power levels of the data and the power levels of the noise for each of the successively communicated power control groups, the ratio representing the communication channel indicia associated with the communication channel;

generating a ratio report reporting the ratio between the power levels of the data and the power levels of the noise for each of the successively communicated power control groups; and communicating the generated ratio report upon a reporting channel for each of the successively communicated power control groups.

8. The method of claim 7 further comprising the operations of estimating the pilot channel for each of the successively communicated power control groups and forming channel-estimated representations of each of the successively communicated power control groups.

9. The method of claim 7, wherein the power levels of the data are calculated based upon filtered representations of the data.

10. The method of claim 7, wherein the power levels of the noise are calculated based upon unfiltered representations of the data.

* * * * *